United States Patent [19]

Marino, Jr.

[11] 4,274,085
[45] Jun. 16, 1981

[54] FLEXIBLE MODE DES SYSTEM

[75] Inventor: Joseph T. Marino, Jr., Chandler, Ariz.

[73] Assignee: Motorola, Inc., Schaumburg, Ill.

[21] Appl. No.: 53,018

[22] Filed: Jun. 28, 1979

[51] Int. Cl.³ .............................................. G06F 5/04
[52] U.S. Cl. .......................... 340/347 DD; 235/92 SH
[58] Field of Search ................... 340/347 DD, 166 R; 235/92 SH; 364/900; 307/221 R

[56] References Cited

U.S. PATENT DOCUMENTS

| 3,573,799 | 4/1971 | Drinman | 340/347 DD |
| 3,631,464 | 12/1971 | Dahlberg | 340/347 DD |
| 3,657,699 | 4/1972 | Rocher | 340/347 DD |
| 3,778,773 | 12/1973 | Hood | 340/166 R |
| 3,860,908 | 1/1975 | Stratton | 340/347 DD |
| 4,041,453 | 8/1977 | Umeda | 340/347 DD |
| 4,139,839 | 2/1979 | Engel | 340/347 DD |

Primary Examiner—Charles D. Miller
Attorney, Agent, or Firm—M. David Shapiro; Eugene A. Parsons

[57] ABSTRACT

A DES (Data Encryption Standard) system utilizing an input register, control logic and output register to provide for a selection from a multiplicity of operable modes on a single chip or family of chips.

4 Claims, 9 Drawing Figures

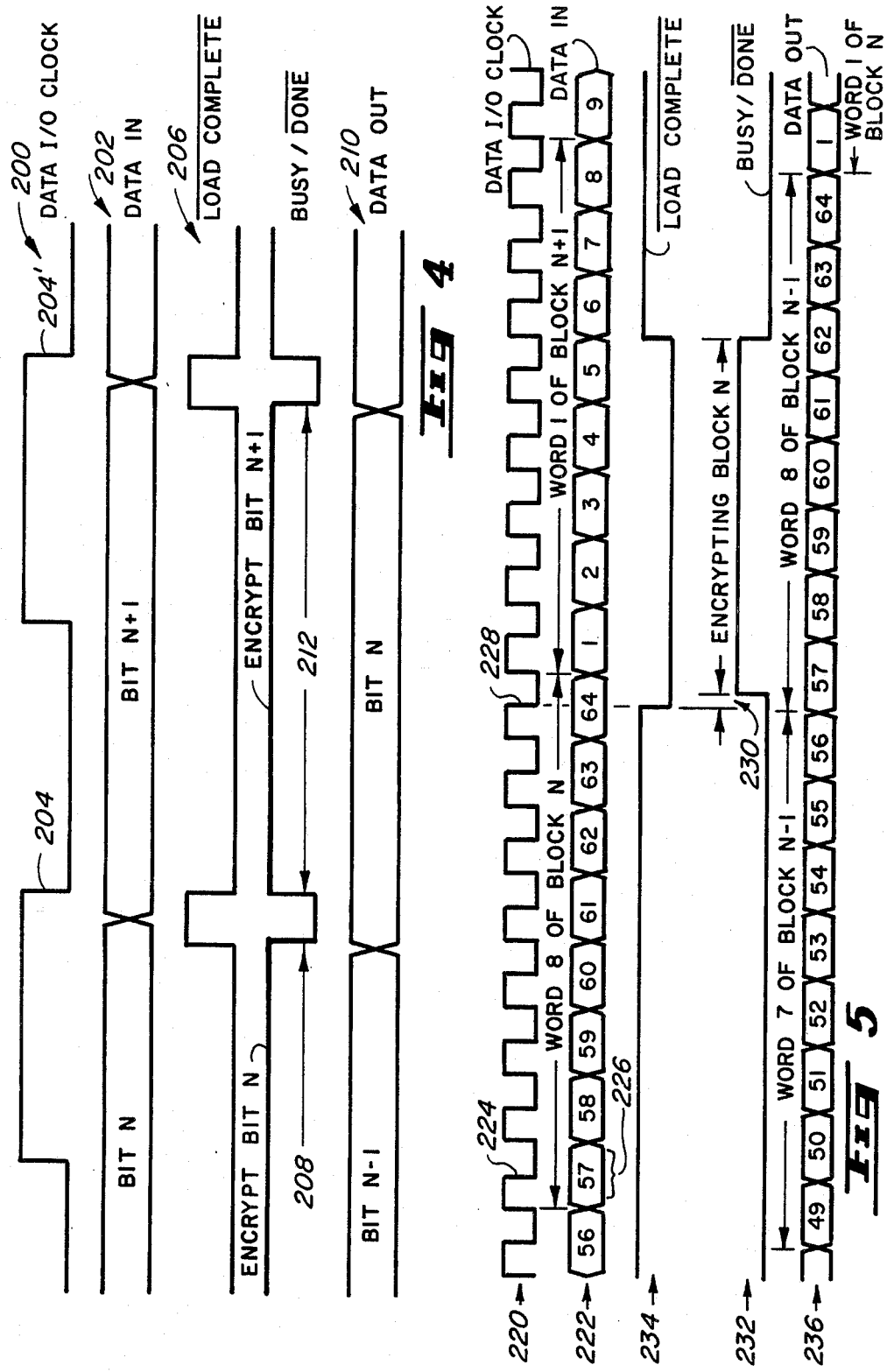

Figure 7:
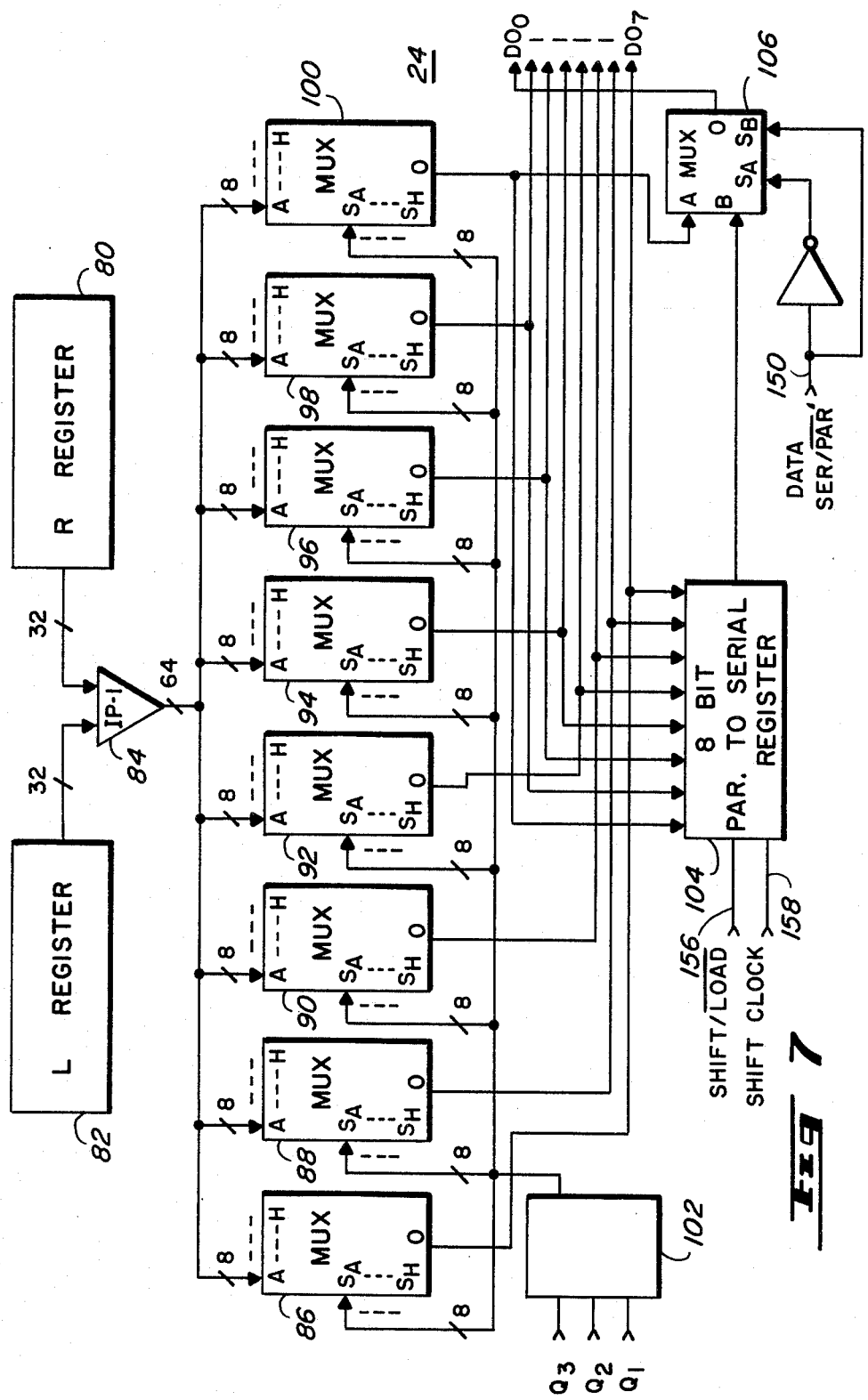

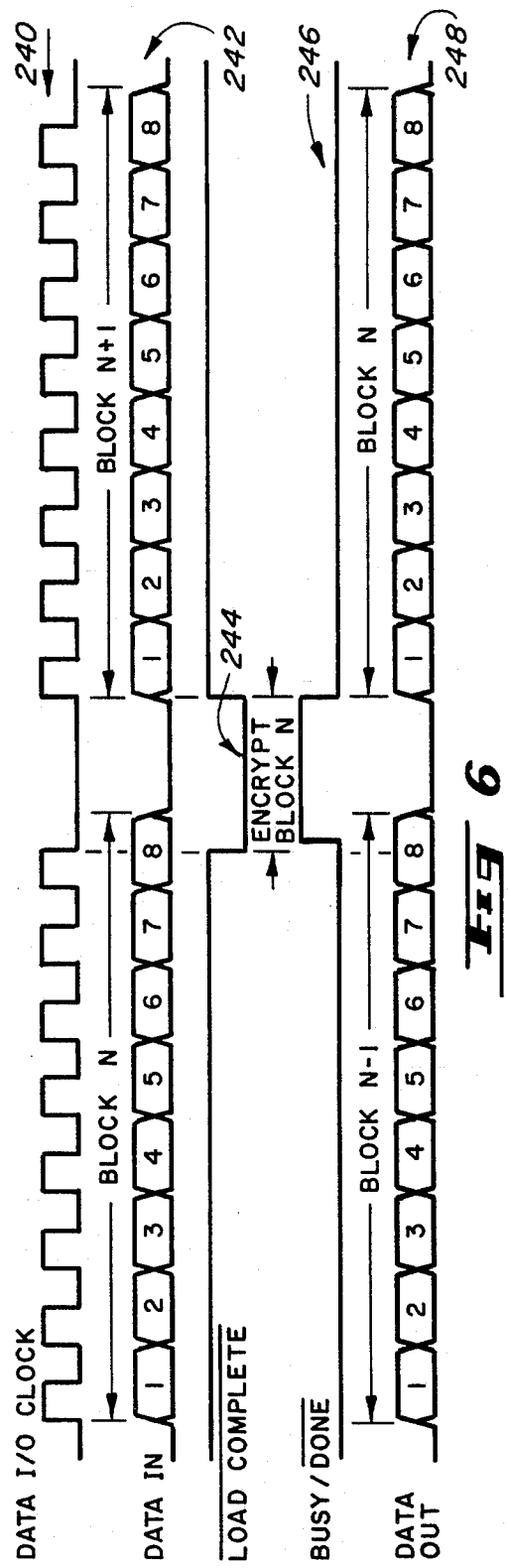
Fig 6
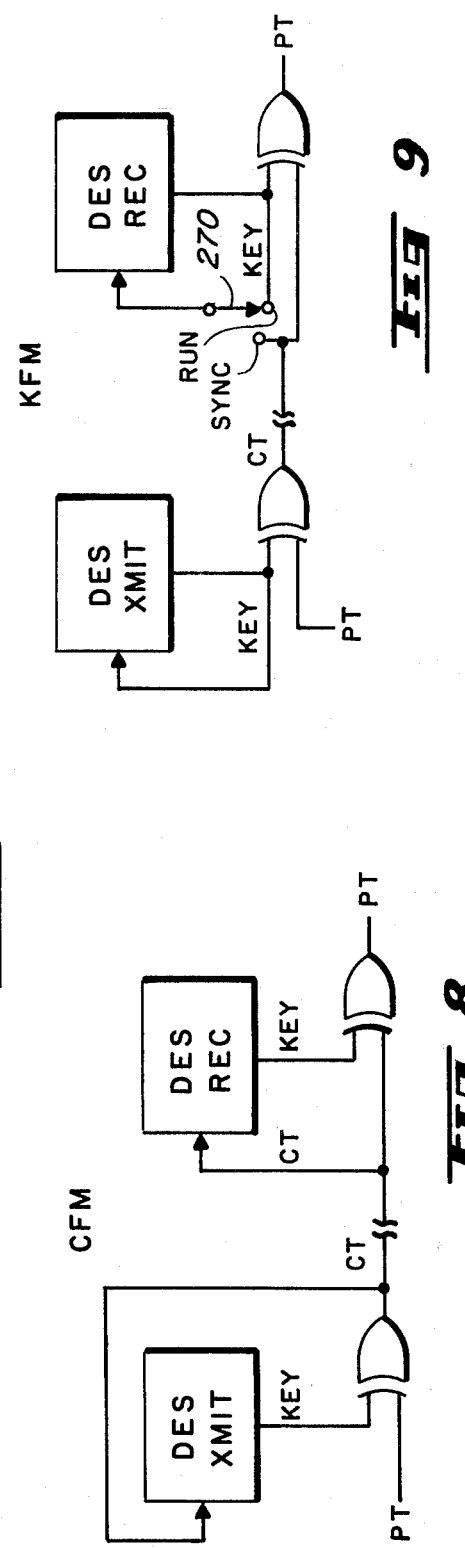
Fig 7
Fig 8

FLEXIBLE MODE DES SYSTEM

FIELD OF THE INVENTION

The invention relates to a semiconductor chip or system configuration which provides for a plurality of operational modes within the constraints of a DES system.

BACKGROUND OF THE INVENTION

"Federal Information Processing Standards Publication (FIPS PUB) 46", published on Jan. 15, 1977 defines a Data Encryption Standard (DES) which may be used for encryption and decryption in a plurality of operational modes. Generally, each of the various modes of operation are accomplished by implementation in a circuit designed and fabricated for the particular mode desired in a particular application. This has meant that a supplier to the industry, in order to be responsive to the needs of a variety of DES users, has had to develope and/or inventory circuits of a number of various types in order to serve his customers. As an alternative, he may have to implement some or all of the various modes in a computer. This prior approach to the problem uses computer memory capacity, requires software and results in slower system operation as well as being more expensive in terms of hardware cost and slower operation.

SUMMARY OF THE INVENTION

In order to overcome the above problems and shortcomings and to provide a circuit which is very flexible in terms of the applications in which it will function, the present invention is a digital electronic circuit which may be embodied in one or more integrated circuit semiconductor chips, comprising a segmented serial/parallel input register, a control circuit and a switchable output register together with other circuit portions which are typical of contemporary DES systems.

It is, therefore, an object of the present invention to provide a DES encryption/decryption circuit capable of operating in a plurality of modes.

It is another object of the invention to provide a versatile serial/parallel input register in a DES circuit which, in turn, provides extreme flexibility of the circuit in terms of the operating modes which may be accomplished.

It is yet another object of the invention to provide a programmable serial/parallel input register in an encryption/decryption circuit so that any one of a plurality of operating modes may be selected by means of mode control signals applied to the circuit of the invention.

Figure 1:
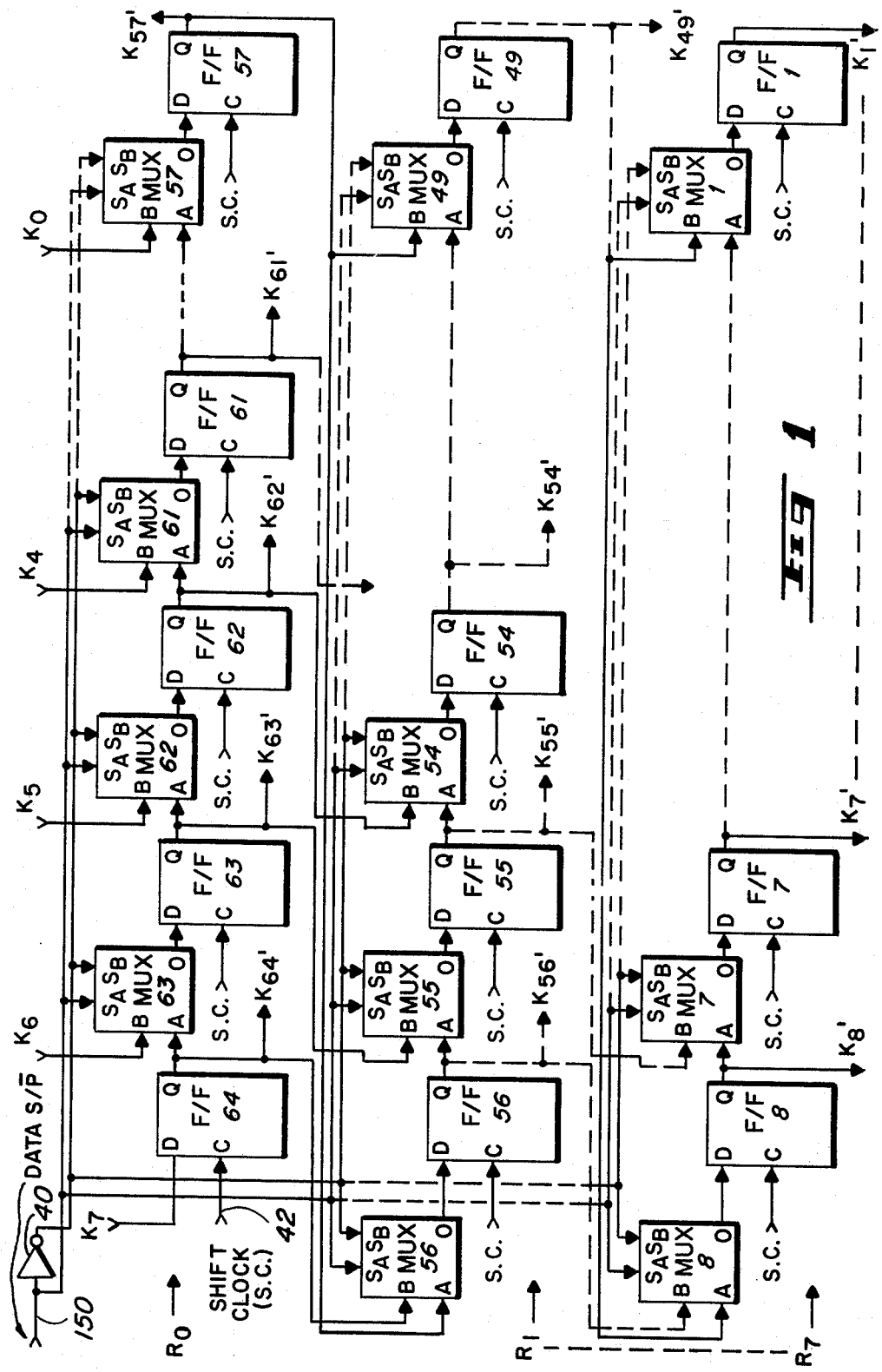
Figure 2:
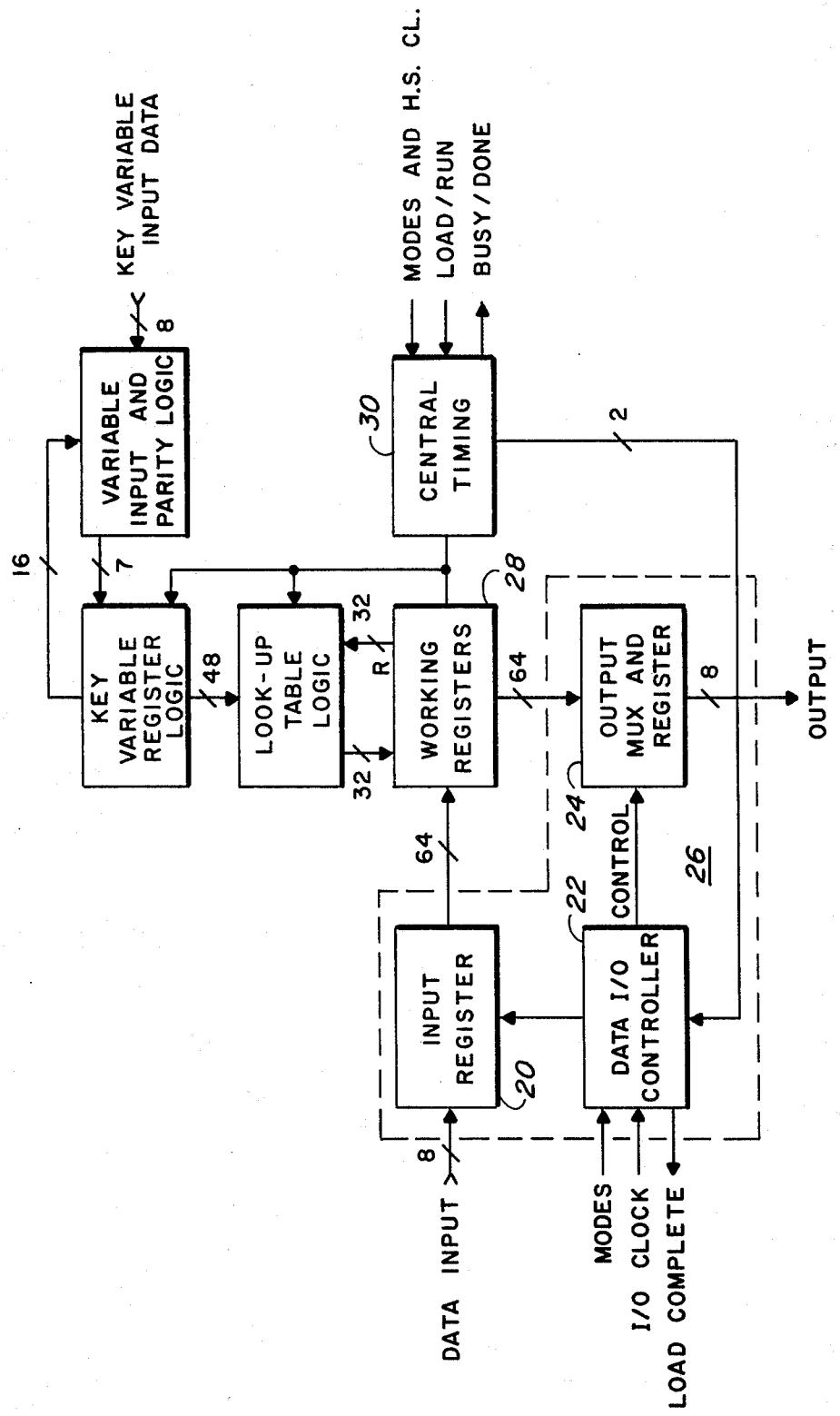
Figure 3:
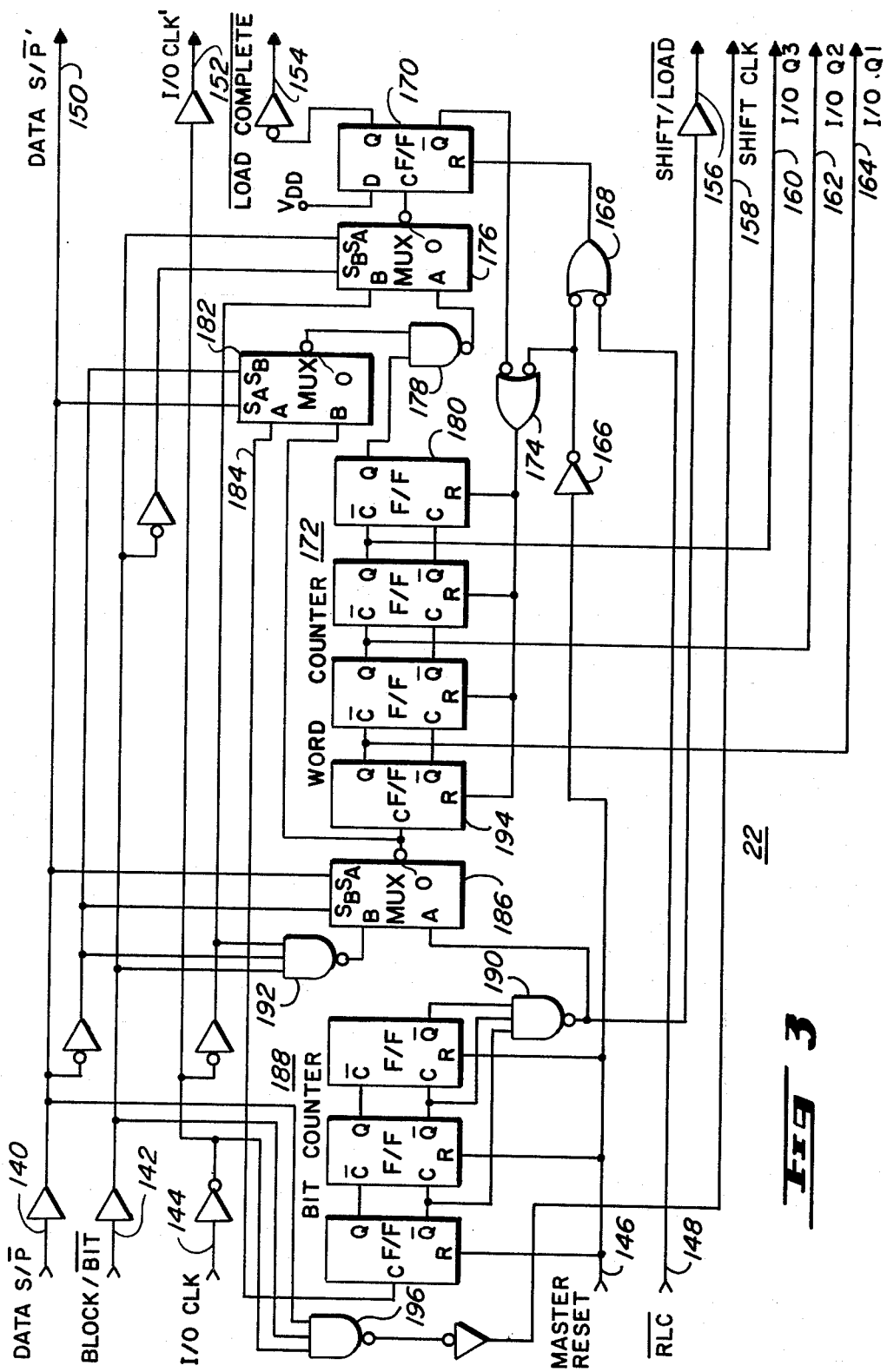

These and other objects of the invention will be more clearly understood upon study of the Detailed Description of the Invention, below, together with the drawings in which:

FIG. 1 is a partial logic diagram of an embodiment of a serial/parallel register suitable for use in the circuit of the invention, FIG. 2 is a block diagram of a circuit embodying the invention, FIG. 3 is a detailed logic diagram of one embodiment of the Data Input/Output Controller which is a part of the circuit of FIG. 2, FIG. 4 is a timing diagram for the system of FIG. 2 when it is controlled to operate in a serial or parallel, cipher or key feedback mode, FIG. 5 is a timing diagram for the system of FIG. 2 when it is controlled to operate in a continuous serial block mode of operation, FIG. 6 is a timing diagram for the system of FIG. 2 when controlled to operate in a parallel block mode of operation, FIG. 7 is a logic diagram of the MUX/output register of the circuit of FIG. 2, FIG. 8 is a system block diagram, including transmitter and receiver, operating in a cipher feedback mode, and FIG. 9 is a system block diagram, including transmitter and receiver operating in a key feedback mode.

DETAILED DESCRIPTION OF THE INVENTION (The reader should note that nearly all description below applies to encryption of decryption circuits but the explanations are limited, for the most part, to encryption.)

FIG. 2 depicts a block diagram of the invention. Input/Output register 20, data I/O controller 22 and output MUX and register 24 make up input/output control subsystem 26. A portion of input register 20 is shown in logic diagram form in FIG. 1. Flip-flops 1-64 are divided into eight sub-registers $R_0-R_7$. Each of subregisters $R_0-R_7$ comprise eight flip-flops. For example, subregister $R_0$ comprises flip-flops 64-57; $R_1$ comprises flip-flops 56-49 and $R_7$ comprises flip-flops 8-1. Notice that the number assigned to each flip-flop corresponds to a bit number of an input word. Each flip-flop is associated with a switch or MUX having a corresponding number designation except F/F 64. For example, the row of MUX's in subregister $R_0$ (which comprises flip-flops 64-57) comprises numbers 63-57. All of the MUX's 63-1 operate as follows; if "$S_A$" is high (true) the input as "A" appears at output "O". If "$S_B$" is high, the input at "B" is present at output "O". The input at "D" of F/F 64 is $K_7$, a serial bit stream. If "$S_A$" of MUX 63 is true, the output "O" will follow the input at "A". Note that all "$S_A$"s are connected in common to control signal "Data Serial/Parallel" and that the complement of this signal, developed by inverter 40, is applied to all "$S_B$" inputs of all 63 MUXs 63-1. When "$S_A$" is true, MUXs 63-1 serve to connect flip-flops 64-1 in series as a single 64 bit long serial shift register. After 64 input bits are serially shifted into this 64 bit serial register, the first input bit appears at "$K_1'''$" the Q output of flip-flop 1. When $S_B$ goes true, sub-registers $R_0-R_7$ are connected as eight parallel shift registers. The inputs to sub-register $R_0$, in this case, are bits $K_7-K_0$, as shown in FIG. 1. These are the first eight bits of a 64 bit input word and comprise byte $D_1$. MUXs 63-1 are controlled so that on subsequent shift clock 42 inputs to flip-flops 64-1, the byte $D_1$ in $R_0$ is shifted in parallel to $R_1$ and a new word or byte is shifted into $R_0$ from terminals $K_7-K_0$. The process continues until $R_0-R_7$ are filled. The sampling is done from $K_{64}'-K_1'$. This whole sequence of events is made possible because when $S_B$ is true, for example, the Q output of flip-flop 64 of $R_0$ is connected to the D input of flip-flop 56; the Q output of flip-flop 56 is connected to the D input of flip-flop 48 (not shown) etc. and flip-flop 16 (not shown) is similarly connected to flip-flop 8. Also, similarly, flip-flops 63-57 are connected in parallel through each of the last seven flip-flops, respectively, of $R_0$–$R_7$ to provide a shifted parallel output from all flip-flops 63-1 after the eighth shift. Subregisters $R_0$–$R_7$ are then parallel sampled to working registers 28, see FIG. 2. This procedure allows preservation of any combination of bits in input register 20 for later use.

Of course, shift clock (S.C.) 42 input to all flip-flops 64-1 and the control signal "Data Serial/Parallel" must be set and coordinated for the desired operation of shift register circuit 20 of FIG. 1. Data I/O controller 22 of FIGS. 2 and 3 performs these functions in the system of FIG. 2. The detailed operation of controller 22 will be disclosed, infra.

Output MUX and register 24 of FIG. 2 is disclosed in more detail in FIG. 7. Working registers comprising R (right) register 80 and L (left) register 82 feed 32 bits each to IP-1 84, the inverse of the initial permutation of the key variable. IP-1 84 has a 64 line parallel output. Eight bytes of eight bits each are fed to MUXs 86, 88, 90, 92, 94, 96, 98 and 100, respectively. The eight bits of each byte are fed to one set of MUX inputs A, B, C, D, E, F, G and H. MUX control lines SA, SB, SC, SD, SE, SF, SG and SH are used to select the corresponding A-H input line for the "O" input for that particular MUX. The eight selected signals are then fed in parallel to 8 bit parallel to serial register 104 and to output terminals $D_{O1}$–$D_{O7}$ and to MUX 106.

In a data serial operational mode of the DES system, MUX 106 supplies a serial string of eight bits to output data terminal $DO_0$ by means of the SB control input. The bits are shifted out of register 104 in serial fashion after they are loaded from MUXs 86-100. In a data parallel operational mode of the DES system, output terminals $DO_0$–$DO_7$ are fed in parallel from MUXs 86-100 with MUX 106 directing the output of MUX 100 to $DO_0$ under control of the SA control input line of MUX 106.

Decoder 102 serves to decode input control lines $Q_1$, $Q_2$ and $Q_3$ (an octal word), from the circuit of FIG. 3, into a one-of-eight line output. This one-of-eight line output is used to select each of the eight bytes, in turn, in MUXs 86-100 by means of the SA through SH control inputs.

The control and timing circuits of FIG. 3 is used to establish the mode of operation of the invention and to provide the timing for that mode which is selected. It may be seen from Table I, below, that there are three timing diagrams which cover all of the best embodiment modes of operation of the invention.

The timing diagram of FIG. 4 is in effect for the feedback modes of operation; serial cipher feedback, serial key feedback, parallel cipher feedback and parallel key feedback. These modes may be referred to in a group as the bit modes. For the parallel modes of operation DATA S/$\overline{P}$ 140 is low or false and for the serial modes it is high or true and BLOCK/$\overline{BIT}$ 142 is false or low in either case. With these specified inputs on DATA S/$\overline{P}$ 140 and BLOCK/$\overline{BIT}$ 142, bit counter 188 is disabled as is word counter 172. Output lines 156, 158, 160, 162 and 164 are all held low and are thus disabled. $\overline{LOAD\ COMPLETE}$ 154 is generated by I/O CLOCK 144 into the B input of MUX 176 under control of the SB input to MUX 176 from BLOCK/$\overline{BIT}$ 142 signal. In this way I/O CLOCK 144 input controls the clock (C) input to flip-flop 170 and produces a $\overline{LOAD\ COMPLETE}$ signal 154 which follows I/O CLOCK 144 input. Since SB of MUX 176 is high, only the B input is transmitted through MUX 176 to the O output and hence to the C input of flip-flop 170. Note that I/O CLOCK 144 signal goes through two inverters on the way to the B input of MUX 176, but MUX 176 also inverts the signal so that the output of MUX 176 is I/O CLOCK 144 inverted. Gates 192 and 196 outputs are held high in this mode of operation by the low input from BLOCK/$\overline{BIT}$ 142. Under these conditions no clock signals are fed to bit counter 188 or word counter 172. Flip-flop 170 is reset at the R input by either MASTER RESET 146 or $\overline{RESET\ LOAD\ COMPLETE}$ ($\overline{RLC}$) signal 148 via gate 168. The clock and reset input to flip-flop 170 provide a $\overline{LOAD\ COMPLETE}$ signal 154 which is $\overline{LOAD\ COMPLETE}$ 206 signal of timing diagram FIG. 4.

The timing diagram of FIG. 6 applies to the parallel block, block cipher feedback, block key feedback and block chain modes listed in Table I. In these modes of operation BLOCK/$\overline{BIT}$ signal 142 (FIG. 3) is held high and data S/$\overline{P}$ 140 is held low. This combination sets SA of MUX 176 high enabling the A input and sets the SB control input to MUX 182 high enabling the B input to MUX 182. Bit counter 188 is held inactive by the high output from gate 196 caused by the low input from DATA S/$\overline{P}$ 140. This disables SHIFT/$\overline{LOAD}$ 156 output and SHIFT CLOCK 158 output but enables I/O Q1 164, I/O Q2 162 and I/O Q3 169 all generated by word counter 172. SB of MUX 186 is high thereby connecting the B input of MUX 186 to the output and hence to the clock input of flip-flop 194 of word counter 172 and to the B input of MUX 182. All flip-flops in word counter 172 are toggle flip-flops. Since I/O CLOCK 144 is transmitted through two inverters to one of the inputs of gate 192 and since gate 192 is enabled by high inputs from DATA S/$\overline{P}$ 140 inverted and BLOCK/$\overline{BIT}$ 142 and I/O clock is applied through MUX 186. However the output of MUX 182 is NANDed in NAND gate 178 with the output of word counter 172, specifically, the Q output of flip-flop 180, to provide a clock pulse once per byte at the A input of MUX 176 and hence to the C input of flip-flop 170. The Q output of flip-flop 170 is inverted and presented as $\overline{LOAD\ COMPLETE}$ signal 154. Again flip-flop 170 is reset by either MASTER RESET signal 146 or the $\overline{RESET\ LOAD\ COMPLETE}$ ($\overline{RLC}$) signal 148 through gate 168 to the reset input of flip-flop 170. Upon reset, the $\overline{Q}$ output of flip-flop 170 is used to reset word counter 172 through gate 174. This arrangement yields a one bit clock pulse at $\overline{LOAD\ COMPLETE}$ 154 for each 8 bit byte counted by work counter 172. This is the $\overline{LOAD\ COMPLETE}$ signal at 244 of FIG. 6. The Q outputs of the first three flip-flops of word counter 172 provide signals I/O Q3 160, I/O Q2 162 and I/O Q1 164. These signals are connected to the output MUXs of FIG. 7 through one-to-eight logic 102. These one-of-eight outputs to the MUXs of FIG. 7 serve to select specific bytes from the processed word as was previously explained.

FIG. 5 depicts the timing sequences for continuous serial block mode operation. In this mode of operation BLOCK/$\overline{BIT}$ 142 is set high as is DATA S/$\overline{P}$ 140. This is necessary in order to operate in the block serial mode. Since MUX 186 input SA is high and SB is low, only the A input is transferred to the O output of MUX 186. The A input of MUX 186 is derived from NAND gate 190 which is fed from the three $\overline{Q}$ outputs of the flip-flops of bit counter 188. All of the flip-flops in bit counter 188 are toggle flip-flops. NAND gate 196 supplies clock pulses to bit counter 188 and SHIFT CLOCK 158 at an output of the circuit of FIG. 3. Bit counter 188 counts bits to eight and NAND gate 190 supplies a clock pulse to the A input of MUX 186 on each eighth count, that is when bit counter 188 is set to all zeros. The clock pulse from the output of MUX 186 is connected to the clock input of word counter 172 so that word counter 172 advances one count for each eighth bit output from bit counter 188. Since SA of 182 is high, A input 184 to MUX 182 is enabled. This means that the same clock pulse which is supplied to bit counter 188 (clock pulse 184) is supplied to NAND gate 178. The other input to NAND gate 178 is from the Q output of flip-flop 180, the last flip-flop of word counter 172. The output from NAND gate 178, therefore, provides a clock pulse to flip-flop 170 in order to give a true output on $\overline{\text{LOAD COMPLETE}}$ 154 at the end of the eighth bit of the eighth byte of the input word. Flip-flop 170 is reset by NOR gate 168 as has been explained before. That is, either by $\overline{\text{RESET LOAD COMPLETE (RLC)}}$ signal 148 or by MASTER RESET 146. Note that MASTER RESET 146 also resets bit counter 188 and word counter 172.

In the serial block mode of operation, SHIFT-/$\overline{\text{LOAD}}$ 156, SHIFT CLOCK 158, I/O Q3 160, I/O Q2 162 and I/O Q1 164 are all enabled by the circuit of FIG. 3. It should also be noted that SHIFT CLOCK 158 is merely I/O CLOCK 144 as gated through NAND gate 196 and inverted. SHIFT CLOCK 158 is used to shift the data out of the output register of FIG. 7. SHIFT/$\overline{\text{LOAD}}$ 156 is used to control shifting and loading of the output register of FIG. 7. When SHIFT-/$\overline{\text{LOAD}}$ 156 signal is high, SHIFT CLOCK 158 controls the output register to right shift the bits in that register. When SHIFT/$\overline{\text{LOAD}}$ 156 signal goes low, the output register of FIG. 7 is loaded. Since SHIFT-/$\overline{\text{LOAD}}$ 156 goes low at the end of each 8 bits of the bit counter 188 input, loading of the shift register of FIG. 7 occurs at the end of each byte. Each byte in the shift register is then shifted right under control of a high SHIFT/$\overline{\text{LOAD}}$ 156 signal, as explained before. This completes the explanation of the operation of the circuit of FIG. 3.

From the above description of the system of the invention, it will be clear to one of average skill in the art that a variety of operational modes may be accomplished with the invention. At least a partial list of these modes and corresponding timing diagrams are set out in Table I, below:

TABLE I

| Mode | Timing Diagram |
| --- | --- |
| (1) Serial Cipher Feedback | FIG. 4 |
| (2) Serial Key Feedback | FIG. 4 |
| (3) Parallel Cipher Feedback | FIG. 4 |
| (4) Parallel Key Feedback | FIG. 4 |
| (5) Continuous Serial Block | FIG. 5 |
| (6) Parallel Block | FIG. 6 |
| (7) Block Cipher Feedback | FIG. 6 |
| (8) Block Key Feedback | FIG. 6 |
| (9) Block Chain | FIG. 6 |

FIG. 4 may be referred to for a timing diagram for a cipher feedback (CFM) or key feedback mode (KFM) either in serial (bit by bit) or parallel (8 bit byte) operation. "DATA I/O CLOCK" signal 200 is fed to controller 22 (see FIGS. 2 and 3) in synchronism with "DATA IN" 202. That is, trailing edges 204, 204' of CLOCK 200 fall timewise within data bit times N, N+1, respectively, as shown at 202. "$\overline{\text{LOAD COMPLETE}}$" signal 206 goes low on trailing edge 204 of CLOCK 200 and this low signal allows encryption of bit N during time period 208. At the end of the encryption time, the time taken for full exercise of the DES algorithm, "$\overline{\text{LOAD COMPLETE}}$" goes high and bit N is outputted and is available for feedback as shown at 210. Bit N+1 is ready for encryption as shown in time frame 212, slightly delayed from bit N data out time. In serial mode, 63 bits are saved in input register 20 and in parallel mode 56 bits are saved precluding necessity for reloading these bits, thus increasing throughput speed. Of course, it will be understood that in parallel mode operation, either CFM or KFM, eight bit N's comprising one byte of the eight byte output word are processed in parallel yielding eight times the throughput compared to serial operation.

FIG. 5 shows a timing diagram for continuous serial block mode operation. "I/O CLOCK" is shown at 220. "DATA IN" is shown at 222. Word 8 of block N comprises bits 57–64, as shown at 222. Trailing edges (as typified at 224 of CLOCK 220) are used to clock data bits (as typified by bit 57 at 226) into the input register (20 in FIG. 2). As soon as bit 64 is clocked into the input register by trailing edge 228 of "I/O CLOCK" 220, encryption of block N begins. This occurs after short delay 230, as shown by "BUSY/$\overline{\text{DONE}}$" signal 232. At the beginning of delay 230, word 8 of block N−1 begins to be outputted as shown by the diagram of "DATA OUT" 236. By the time word 1 of block N is outputted (see "DATA OUT" 236 timing), the encryption of all 64 bits of block N is complete. As each word of each block (N) is outputted, that same word of the next input block (N+1) has just been inputted, see 222. This allows a continuous output string of blocks and bits simultaneous with a continuous string of input blocks and bits with the output timing being delayed by approximately 9 words or bytes from the corresponding input byte timing. Encryption of each 64 bit block (N) occurs during the output of the eighth word of the prior block (N−1).

A timing diagram for a parallel block mode of operation is shown in the timing diagram of FIG. 6. "DATA I/O CLOCK" is shown at 240. Note that some of the clock pulses are missing between blocks N and N+1, 242. In the portion of the timing diagram shown, it will be seen that block N is encrypted 244 during this time period. "DATA WORD OUT" signal 248 shows that block N is outputted while block N+1 is inputted (242). Note also that encryption 244 of block N begins while the eighth byte of block N is still on the input of input register 20; that is, as soon as the eighth byte is recognized, encryption can begin.

FIG. 8 shows an overall block diagram of the DES system for Cipher Feedback Mode operation and FIG. 9 illustrates a similar system for Key Feedback Mode operation. Sync/run switch 270 must be operated to the SYNC position for at least 64 bit times at the beginning of operation of this mode. It may then be operated to the RUN position to provide decryption.

In serial CFM or serial KFM one bit is entered and one bit is outputted at a time. 63 bits are saved in the I/O register. In parallel CFM and KFM, one byte (or word) is entered and one byte outputted. Seven bytes are saved in the I/O register. In the block mode, all 64 bits of an input data word are entered, operated upon and outputted, either serially or in parallel during each cycle. In continuous serial block mode, the algorithm (for encryption or decryption) runs for less than ⅛ of the time. Input register 20 and output register 104 (FIG. 2) provide buffering to allow continuous serial operation even while the algorithm operation is in process. This allows speed of about eight times that of serial feedback modes. Substantially the same speed may be attained with parallel feedback modes.

The system of the invention allows simultaneous loading of input data and unloading of output data. This allows parallel block modes to run approximately eight times faster than continuous serial block mode operation.

Of course, the circuit of the invention is able to provide any of the above modes of operation and the user may select that mode best adapted to his needs. The invention, as described herein may be readily adapted to fill the requirements of the individual user by means of the selection of appropriate feedback hardware for example such as that shown in FIGS. 8 or 9.

While the invention has been particularly shown and described with reference to a preferred embodiment thereof, it will be understood by those skilled in the art that various other modifications and changes may be made to the present invention from the principles of the invention described above without departing from the spirit and scope thereof, as encompassed in the accompanying claims. Therefore, it is intended in the appended claims to cover all such equivalent variations as come within the scope of the invention as described.

I claim:

1. In a digital processing system, the combination comprising:
   at least one working register, said at least one working register having an input and outputs, said outputs further comprising:
     a predetermined byte position output; and
     a plurality of byte position outputs;
   an input register, said input register being controllable for accepting one of serial and parallel inputs, said input register further comprising a plurality of switching means for switching a plurality of sub-registers of said input register to one of serial and parallel configuration;
   an output circuit, said output circuit having connections to said at least one working register for accepting one of a single byte from said predetermined position in said at least one working register and a plurality of bytes from said plurality of byte positions in said at least one working register, said output circuit being controllable for outputting one of a serial bit stream and a serial stream of parallel bytes, said output circuit being connected to said input register;
   a control circuit, said control circuit being connected to said input register, said at least one working register and to said output circuit, said control circuit being adapted to select one of said outputs of said at least one working register for application to said output circuit, one of said serial and parallel inputs to said input register and one of said outputs of said output circuit, said control circuit being adapted to supply clock pulses to said input register, said working register and said output circuit, said clock pulses having timing sequences responsive to a combination of said selections of said control circuit.

2. The data processing system according to claim 1 wherein the data processing comprises one of encryption and decryption of digital data and wherein said control circuit comprises means for selecting operation of the encryption/decryption system in any one of at least the following modes:
   (1) serial cipher feedback,
   (2) serial key feedback,
   (3) parallel cipher feedback,
   (4) parallel key feedback,
   (5) continuous serial block,
   (6) parallel block,
   (7) block cipher feedback,
   (8) block key feedback, and
   (9) block chain.

3. The system according to claim 1 or 2 wherein said output circuit further comprises:
   first means for switching a plurality of bits into a sub plurality of parallel bytes;
   an output register for accepting said parallel bytes and converting said parallel bytes to a serial format; and
   second means for switching under control of said plurality of means for switching to produce one of serial bits and parallel byte outputs.

4. A mode flexible digital encryption/decryption system comprising:
   DES means for one of encrypting and decrypting;
   an input register controllable for one of serial and parallel input signal operation, said input register having an output comprising a plurality of parallel bit lines, said output of said input register being connected to a corresponding plurality of input lines of said DES encrypting and decrypting means, said input register further comprising:
     a plurality of sub-registers, each of said sub-registers being of one byte length;
     a plurality of means for switching said plurality of sub-registers to one of said serial and parallel operations;
   output circuit means for connecting an output of said DES means to one of serial bit stream output and serial byte output, said output circuit means being adapted to accept one of a single byte from a predetermined location in an output register of said DES means and a plurality of bytes from a like plurality of locations in said output register; and
   means for controlling said input register, said DES means and said output means for providing one of at least the following encryption/decryption modes:
   (1) serial cipher feedback,
   (2) serial key feedback,
   (3) parallel cipher feedback,
   (4) parallel key feedback,
   (5) continuous serial block,
   (6) parallel block,
   (7) block cipher feedback,
   (8) block key feedback, and
   (9) block chain.

* * * * *